(12) United States Patent
Peng

(10) Patent No.: US 10,171,240 B2
(45) Date of Patent: Jan. 1, 2019

(54) ACCESSING RESOURCES IN PRIVATE NETWORKS

(71) Applicant: SuccessFactors, Inc., South San Francisco, CA (US)

(72) Inventor: Yang Peng, Shanghai (CN)

(73) Assignee: SUCCESSFACTORS, INC., South San Francisco, CA (US)

( * ) Notice: Subject to any disclaimer, the term of this patent is extended or adjusted under 35 U.S.C. 154(b) by 122 days.

(21) Appl. No.: 14/943,809

(22) Filed: Nov. 17, 2015

(65) Prior Publication Data
US 2017/0142129 A1  May 18, 2017

(51) Int. Cl.
*H04L 9/32* (2006.01)
*H04L 9/30* (2006.01)
*H04L 12/911* (2013.01)
*H04L 29/06* (2006.01)

(52) U.S. Cl.
CPC .............. *H04L 9/30* (2013.01); *H04L 9/3247* (2013.01); *H04L 47/72* (2013.01); *H04L 63/061* (2013.01); *H04L 63/08* (2013.01); *H04L 63/126* (2013.01); *H04L 47/781* (2013.01)

(58) Field of Classification Search
None
See application file for complete search history.

(56) References Cited

U.S. PATENT DOCUMENTS

| 6,446,206 | B1* | 9/2002 | Feldbaum | H04L 63/0823 713/170 |
| --- | --- | --- | --- | --- |
| 9,419,799 | B1* | 8/2016 | Chung | H04L 9/321 |
| 2003/0046587 | A1* | 3/2003 | Bheemarasetti | H04L 63/0272 726/4 |
| 2005/0044197 | A1* | 2/2005 | Lai | G06Q 10/10 709/223 |
| 2008/0178278 | A1* | 7/2008 | Grinstein | H04L 63/0227 726/12 |
| 2014/0281555 | A1* | 9/2014 | Dixon | H04L 63/104 713/176 |
| 2015/0121063 | A1* | 4/2015 | Maller | H04L 63/0435 713/153 |

FOREIGN PATENT DOCUMENTS

WO    WO 2015154119 A1 * 10/2015 ............. G06Q 20/14

* cited by examiner

*Primary Examiner* — Kambiz Zand
*Assistant Examiner* — Arezoo Sherkat
(74) *Attorney, Agent, or Firm* — Fountainhead Law Group P.C.

(57) ABSTRACT

Some embodiments provide a non-transitory machine-readable medium that stores a program. The program receives a queue message from a computing device. The queue message includes a request to perform a set of actions on a resource in a private network and a security signature generated from an authentication operation. The program also stores the queue message in a message queue for later retrieval when the queue message is determined to be valid based on the security signature. The program further sends the queue message to a queue monitor for the queue monitor to instruct the resource to perform the set of actions. Upon receiving a response associated with the queue message from the queue monitor, the program forwards the response associated with the queue message to the computing device.

20 Claims, 5 Drawing Sheets

ACCESSING RESOURCES IN PRIVATE NETWORKS

BACKGROUND

Typically, users in a private network may access any number of different resources (e.g., applications, services, data storages, computing devices, etc.) within the private network. When a user is in another network (e.g., a public network, a different private network, etc.), the user may wish to access such resources in the private network. In some cases, the user may access the resources in the private network using virtual private network (VPN) technologies. Setting up VPNs may be a complex and time consuming. For example, some devices may be difficult to configure, do not support VPN certain features, or are not compatible with VPN technologies.

SUMMARY

In some embodiments, a non-transitory machine-readable medium stores a program that is executable by at least one processing unit of a device. The program receives a queue message from a computing device. The queue message includes a request to perform a set of actions on a resource in a private network and a security signature generated from an authentication operation. The program also stores the queue message in a message queue for later retrieval when the queue message is determined to be valid based on the security signature. The program further sends the queue message to a queue monitor for the queue monitor to instruct the resource to perform the set of actions. Upon receiving a response associated with the queue message from the queue monitor, the program forwards the response associated with the queue message to the computing device.

In some embodiments, the program also drops the queue message when the queue message is determined to be not valid based on the security signature. The program may receive a request for the queue message from the queue monitor. The queue message may be sent to the queue monitor in response to receiving the request for the queue message from the queue monitor.

In some embodiments, determining that the queue message is valid based on the security signature includes decrypting the security signature with a public key generated during a key exchange between the computing device and a security manager in the private network. The authentication operation may generate the security signature by encrypting the security signature with a public key generated during the key exchange. In some embodiments, the computing device belongs to a network different than the private network. In some embodiments, the device belongs to a perimeter network of the private network.

In some embodiments, a method receives a queue message from a computing device. The queue message includes a request to perform a set of actions on a resource in a private network and a security signature generated from an authentication operation. The method also stores the queue message in a message queue for later retrieval when the queue message is determined to be valid based on the security signature. The method further sends the queue message to a queue monitor for the queue monitor to instruct the resource to perform the set of actions. Upon receiving a response associated with the queue message from the queue monitor, the method also forwards the response associated with the queue message to the computing device.

In some embodiments, the method drops the queue message when the queue message is determined to be not valid based on the security signature. The method may receive a request for the queue message from the queue monitor. The queue message may be sent to the queue monitor in response to receiving the request for the queue message from the queue monitor.

In some embodiments, determining that the queue message is valid based on the security signature includes decrypting the security signature with a public key generated during a key exchange between the computing device and a security manager in the private network. The authentication operation may generate the security signature by encrypting the security signature with a public key generated during the key exchange. In some embodiments, the computing device belongs to a network different than the private network. In some embodiments, the device belongs to a perimeter network of the private network.

In some embodiments, a system includes a queue manager configured to receive a queue message from a computing device. The queue message includes a request to perform a set of actions on a resource in a private network and a security signature generated from an authentication operation. The queue manager is further configured to store the queue message in a message queue for later retrieval when the queue message is determined to be valid based on the security signature. The system also includes a queue monitor configured to retrieve the queue message from the message queue, instruct the resource to perform the set of actions, and send a response associated with the queue message to the message queue. The queue manager is further configured to forward the response associated with the queue message to the computing device.

In some embodiments, the queue manager is further configured to drop the queue message when the queue message is determined to be not valid based on the security signature. The determining that the queue message is valid based on the security signature may include decrypting the security signature with a public key generated during a key exchange between the computing device and a security manager in the private network.

In some embodiments, the authentication operation generates the security signature by encrypting the security signature with a public key generated during the key exchange. The computing device may belong to a network different than the private network. The device may belong to a perimeter network of the private network.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for accessing resources in a private network. In some embodiments, a computing device in another network sends to a queue client, which is also in the other network, a request to perform operations on a resource in the private network. In response, the queue client may generate a queue message that includes the request and send the queue message to a queue manager in the private network. A queue monitor in the private network may monitor the queue manager and retrieve the queue message when the queue monitor detects the queue message in the queue manager. The queue monitor may then process the queue message and generate a response indicating the status of the request (e.g., request approved or request denied). The queue monitor sends the response back to the computing device via the queue manager. The queue manager forwards the response to the queue client, which forwards the response to the computing device.

Figure 1:
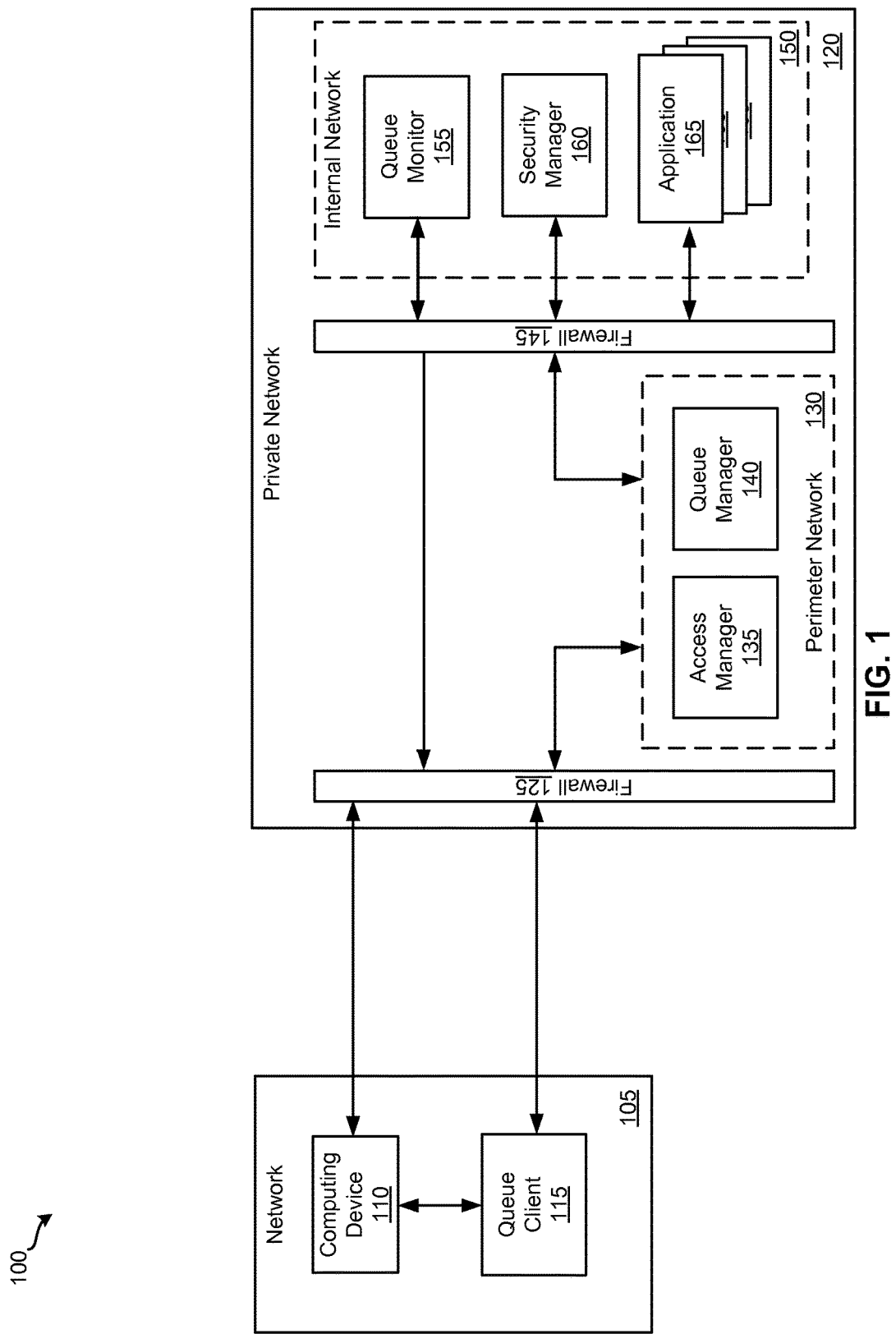
FIG. 1 illustrates a system for exchanging data according to some embodiments.

FIG. 1 illustrates a system 100 for exchanging data according to some embodiments. As shown, system 100 includes network 105 and private network 120. In some embodiments, network 105 may be a public network (e.g., the Internet), a network of networks, a private network, or any other type of network. Private network 120 is a network that uses private Internet Protocol (IP) addresses (e.g., IP addresses 192.168.x.x), in some embodiments. While FIG. 1 shows network 105 and private network 120 communicating directly with each other, one of ordinary skill in the art will understand that network 105 and private network 120 may communicate through another network (e.g., the Internet, a network of networks, a private network, etc.).

As illustrated in FIG. 1, network 105 includes computing device 110 and queue client 115. Computing device 110 may be mobile device, a tablet device, a desktop computing device, a laptop device, a wearable device, or any other type of computing device. In some embodiments, computing device 110 includes a resource access application (not shown) configured to access resources (e.g., applications 165) in private network 120, a security application (not shown) configured to handle security features (e.g., data encryption, data decryption, etc.), and a key management application (not shown) configured to manage security keys (e.g., a private key and public key pair) associated with computing device 110. One of ordinary skill in the art will realize that the functions and/or features of the resource access application, the security application, and the key management application may be implemented in one or more applications. For instance, all three applications may be implemented in a single application, the security application and the key management application may be implemented in one application, etc.

Queue client 115 may be configured to communicate requests that queue client 115 receives from computing device 110 to queue manager 140. In some embodiments, when queue client 115 receives a request from computing client 110, queue client 115 generates a queue message that includes the request and data associated with the request (e.g., a data source type identifier for identifying a data source type, a data type identifier for identifying a data type, an operation type identifier for identifying an operation type, a service type identifier for identifying a service type, an object type identifier for identifying an object type, an object identifier for identifying an object, etc.). Queue client 115 then sends the queue message to queue manager 140. In response to the queue message, queue client 115 may receive a queue message response from queue manager 140 and, in turn, forward to computing device 110. In some embodiments, queue client 115 includes a pre-caching feature that requests operations from resources in private network 120 that queue client 115 anticipates computing device 110 will request. For example, in some such embodiments, data associated with a request and a response to the request may include an object identifier for identifying an object associated with a resource (e.g., an application 165), an object type identifier for identifying an object type of the object, and an operation type identifier that identifies a type of operation (e.g., a create operation, a query operation, an update operation, a delete operation, etc.) associated with the request. Data associated with a request and a response to the request that includes an operation identifier that identifies a query operation may also include a query identifier for identifying a query associated with the object identified by the object identifier. When queue client 115 receives a request that include a command identifier that identifies a create command, queue client 115 may cache the response to the request. When queue client 115 receives a request that includes a command identifier that identifies a query command, queue client 115 may cache the response to the request. This way, queue client 115 may quickly provide computing device 110 with cached responses when computing device 110 requests recently requested objects or queries associated with an object. In some embodiments, queue client 115 may cache certain types of objects. Queue client 115 may remove a response from the cache after a defined amount of time (e.g., 30 minutes, an hour, 12 hours, a day, etc.) has elapsed since the response was requested.

As shown in FIG. 1, private network 120 includes firewalls 125 and 145, perimeter network 130 (also referred to as a demilitarized zone (DMZ) network), and internal network 150. Firewall 125 may be configured to control communication between elements outside of private network 120 and elements within private network 120. In this example, firewall 125 may be configured to allow devices outside of private network 120 (e.g., computing device 110 and queue client 115) to communicate with elements in perimeter network 130 (e.g., access manager 135 and queue manager 140 and prevent devices outside of private network 120 from communicating with elements behind firewall 145 in internal network 150 (e.g. queue monitor 150, security manager 160, and applications 165). Firewall 145 may be configured to control communication for elements in internal network 150. For this example, firewall 145 may be configured to allow elements in internal network 150 (e.g., queue monitor 155, security manager 160, and applications 165) to communicate with elements in perimeter network 130 (e.g., access manager 135 and queue manager 140) and prevent elements outside private network 120 from communicating with elements in internal network 150. In some embodiments, firewalls 125 and 145 are configured to allow elements in internal network 150 to access resources outside of private network 120. One of ordinary skill in the art will recognize that different firewall configurations may be employed in different embodiments. For example, in some embodiments, private network 120 may include one firewall (e.g., firewall 125) that is configured to control communication between network 105 and perimeter network 130 and between network 105 and internal network 150.

As illustrated in FIG. 1, perimeter network 130 includes access manager 135 and queue manager 140. Access manager 135 may be configured to provide authentication and authorization services for users (e.g., user 201 shown in FIG. 2) in private network 120. Access manager 135 may authenticate and authorize users using use any number of different authentication and/or authorization technologies. For instance, access manager 135 may utilize single sign on (SSO) services for authenticating the users in private network 120. Access manager 135 may use an open authorization standard (e.g., OAuth, a security assertion markup language (SAML), etc.) for authorizing the users in private network 120. In some embodiments, access manager 135 may manage or have access to (e.g., via security manager 160) authentication information of users of private network 120. Access manager 135 uses the authentication information to authenticate users of private network 120.

In some embodiments, access manager 135 stores, or has access to (e.g., via security manager 160), private keys of devices (e.g., computing device 110) configured to operate with private network 120. In this example, access manager 135 stores or has access to a private key (e.g., a private key generated during a key exchange between computing device 110 and security manager 160 described below) associated with security manager 160. When a user has been authenticated, access manager 135 may generate a security signature based on a private key (e.g., a private key generated during a key exchange between computing device 110 and security manager 160 described above) associated with security manager 160.

Queue manager 140 facilitates communication between elements outside of private network (e.g., computing device 110 and queue client 115) and elements in private network 120 (e.g., applications 165). That is, queue manager 140 serves as a communication buffer between elements outside of private network and elements in private network 120. Queue manager 140 may include a message queue for storing messages for later retrieval by queue monitor 155. In some embodiments, queue manager 140 is implemented using any type of message-oriented middleware (MOM) such as Apache ActiveMQ, HornetQ, etc. Queue manager 140 may be configured to perform message validation operations. For example, queue manager 140 may store, or have access to (e.g., via security manager 160), a public key (e.g., a public key generated during a key exchange between computing device 110 and security manager 160 described below) associated with computing device 110. In such an example, queue manager 140, may use the public key to decrypt a security signature included in queue messages sent from computing device 110. If the security signature is not valid, queue manager 140 drops the queue message. If the security signature is valid, queue manager 140 stores the queue message for later retrieval by queue monitor 155.

Queue manager 140 may perform additional validation operations to remove invalid and/or duplicate queue messages. For example, queue manager 140 may scan the message queue for multiple update commands for a same data item and/or resource. In such an example, queue manager keeps the latest update command and removes the update commands. Queue manager 140 may perform the same or similar validation operations for multiple delete commands for a same item, multiple query commands for a same query.

As shown in FIG. 1, internal network 150 includes queue monitor 155, security manager 160, and applications 165. Queue monitor 155 may be configured to monitor queue manager 140 for messages stored in a message queue maintained by queue manager 140. In some embodiments, queue monitor 155 retrieves and processes messages stored in the message queue of queue manager 140 on a first-come, first-serve basis. Based on information in a queue message (e.g., data source type, data type, operation information, etc.), queue monitor 155 identifies a corresponding application 165 and sends instructions to the corresponding application 165 to perform operation(s) specified in the queue message. Queue monitor 155 may also send messages to the message queue maintained by queue manager 140 in response to responses queue monitor 155 receives from applications 165.

Security manager 160 may be responsible for providing security functionalities for private network 120. For example, security manager 160 performs security key exchanges with devices (e.g., computing device 110) configured to operate with private network 120. Specifically, in some embodiments, security manager 160 may generate a private key and public key pair associated with security manager 160 and share the public key with a device (e.g., computing device 110). The device may generate a private key and public key pair associated with the device and share the public key with security manager 160. In some embodiments, security manager 160 may share its public and private key with queue monitor 155. The generated private key and public key pair may be used to encrypt and decrypt data (e.g., using a secure communication protocol such as a hypertext transfer protocol secure (HTTPS) protocol) exchanged between the device and private network 120. The security manager 160 stores its generated private key and public key as well as the public key generated by the device while the device stores its generated private key and public key as well as the public key generated by security manager 160. In some embodiments, security manager 160 performs security key exchanges with a device when the device is in private network 120. In some such embodiments, while the device is in private network 120, the device transmits (e.g., as part of a device registration process) its generated public key to queue monitor 155 and queue manage 140. In other embodiments, security manager 160 transmits (e.g., as part of a device registration process) the device's generated public key to queue monitor 155 and queue manage 140. While the examples described in FIGS. 1-4 utilize a private key and public key encryption/decryption technique, one of ordinary skill in the art will understand that other data security techniques may be used. For instance, in some embodiments, a symmetric-key encryption/decryption technique.

Applications 165 may be a desktop application, a web application/service, etc. In some embodiments, applications 165 may be applications for one of any number of different systems (e.g., a human capital management (HCM) system, an enterprise resource planning (ERP) system, a customer relationship management (CRM) system, a supply chain management (SCM) system, a product lifecycle management (PLM) system, etc.). In some embodiments, applications 165 are hosted on one or more computing devices (e.g., application servers).

Figure 2:
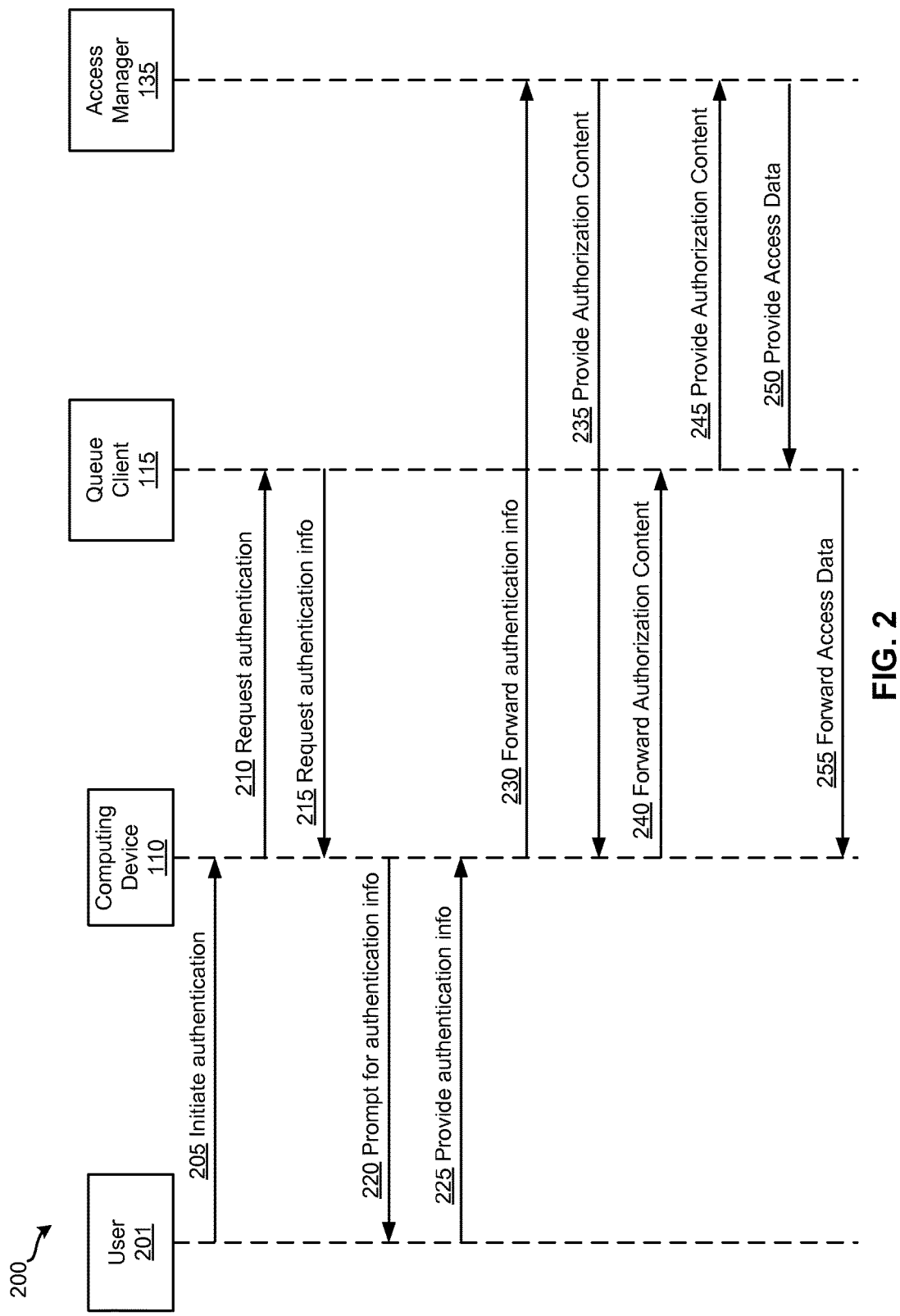
FIG. 2 illustrates a data flow for authenticating a user according to some embodiments.

In some embodiments, a user of computing device 110 is authenticated before the user may access resources in private network 120. An example authentication operation will be described by reference to FIGS. 1 and 2. FIG. 2 illustrates a data flow 200 for authenticating a user 201 according to some embodiments. For this example, user 201 is a user of computing device 110. In some embodiments, the resource access application mentioned above performs the operations performed by computing device 110. Data flow 200 starts by user 201 initiating, at 205, an authentication operation. In some embodiments, user 201 initiates the authentication operation by starting the resource access application operating on computing device 110.

Next, computing device 110 sends, at 210, a request for authentication of user 201 to queue client 115. In response to the request, queue client 115 sends, at 215, a request for authentication information to computing device 110. In some embodiments, queue client 115 sends a redirect to computing device 110 that redirects computing device 110 to access manager 135, which in turn requests computing device 110 for authentication information.

At 220, computing device 110 prompts user 201 for authentication information. In response, user 201 provides, at 225, authentication information. Examples of authentication information includes a username and password, biometric information (e.g., a fingerprint, a voice recording, a retina scan, etc.), a smart card and personal identification number (PIN), etc., or a combination of any number of different authentication information. Computing device 110 forwards, at 230, the authentication information to access manager 135.

In response to receiving the authentication information from computing device 110, access manager 135 authenticates user 201 based on the provided authentication information. As mentioned above access manager 135 may manage or have access to authentication information of valid users (e.g., users of private network 120). Access manager 135 compares the received authentication information against the authentication information of a corresponding valid user. If the received authentication information and the authentication information of a corresponding valid user do not match, access manager 135 may send a response indicating such failure to computing device 110. If the received authentication information and the authentication information of a corresponding valid user match, access manager 135 provides, at 235, authorization content to computing device 110. In some embodiments, the authorization content includes a security signature that access manager 135 generates based on a private key (e.g., a private key generated during a key exchange between computing device 110 and security manager 160 described above) associated with security manager 160. In some such embodiments, the security signature is used for authenticating that the authorization content originated from access manager 135. Access manager 135 may generate the security signature by generating a hash value (e.g., using an MD5 message-digest algorithm, a secure hash algorithm 1 (SHA-1), etc.) of a response to an authentication request and encrypting the hash value with the private key associated with security manager 160.

When computing client 110 receives a response to an authentication request from access manager 135, computing client 110 uses the security signature to verify that the response from access manager 135 is indeed from the access manager 135. Computing client 110 may verify the response by decrypting the encrypted hash value of the security signature using a public key associated with security manager 160 and comparing the decrypted hash value to a hash value generated from the response using the same hash algorithm as access manager 135. The response is verified if the decrypted hash value matches the hash value generated from the response. Next, computing device 110 forwards, at 240, the authorization content to queue client 115. In response, queue client 115 provides, at 245, the authorization content to access manager 135. At 250, access manager 135 provides queue client 115 with access data. In some embodiments, the access data includes an access token for accessing resources in private network 120 without going through the authentication operation described in FIG. 2. In some embodiments, the access token specifies the operation(s) that may be performed, the resource(s) on which the operation(s) may be performed, and user(s) that are authorized to perform the operation(s). The operation for accessing resources in private network 120 is described below by reference to FIG. 3. Finally, queue client 115 forwards, at 255, the access data to computing device 110 for later use in accessing resources in private network 105.

Figure 3:
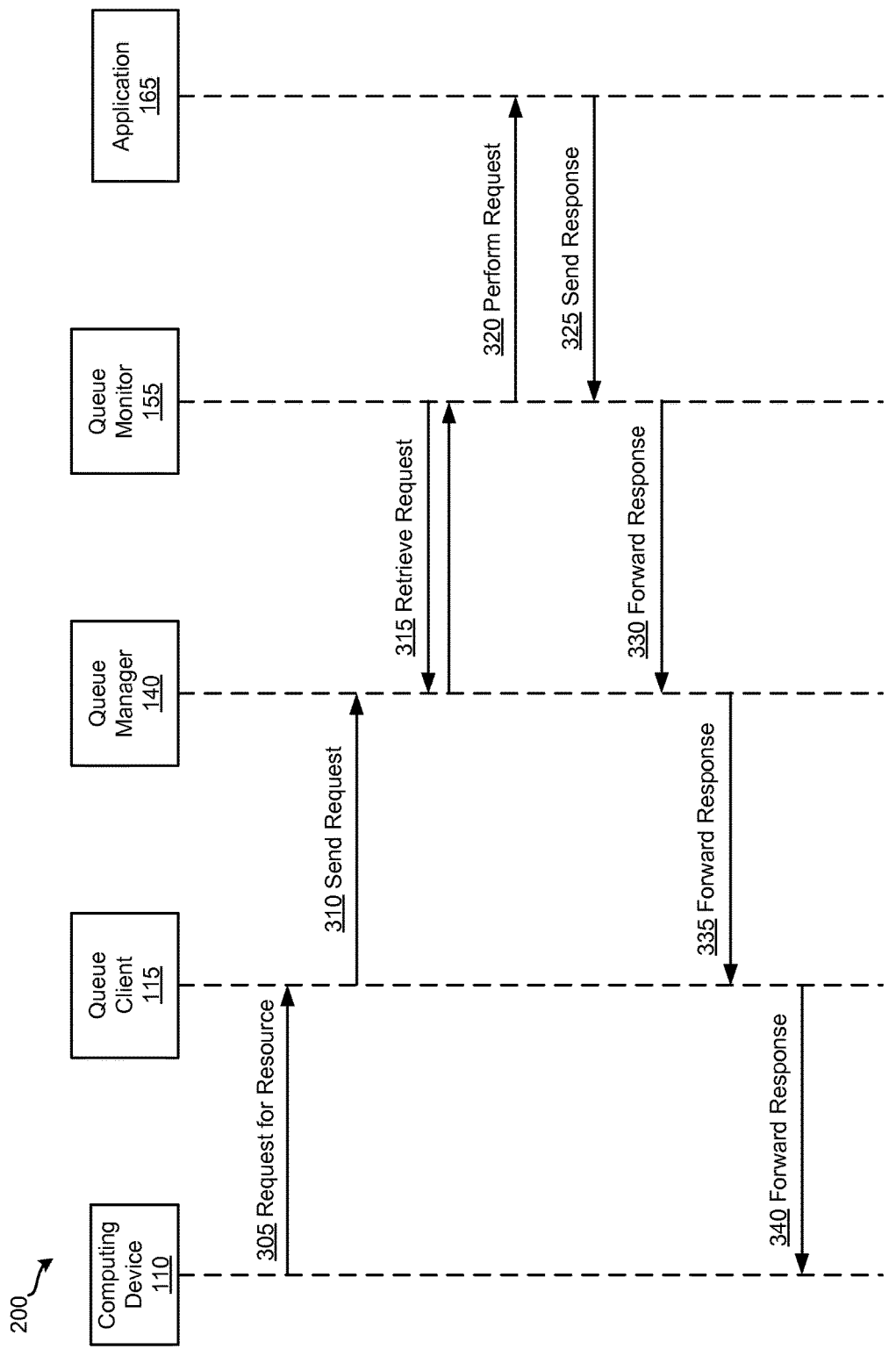
FIG. 3 illustrates a data flow accessing a resource according to some embodiments.

As described above, an authentication operation may be performed, in some embodiments, in order for computing device 110 to obtain access data. In some embodiments, computing device 110 may use such access data to access resources in private network 120. An example resource access operation will be described by reference to FIGS. 1 and 3. FIG. 3 illustrates a data flow 300 for accessing a resource according to some embodiments. In some embodiments, the resource access application mentioned above performs the operations performed by computing device 110. Data flow 300 begins by computing device 110 sending, at 305, a request for access to a resource to queue client 115. In this example, computing device 110 is requesting access to application 165 (e.g., creating data associated with application 165, viewing data associated with application 165, editing data associated with application 165, deleting data associated with application 165, etc.).

The request may include a set of operations to be performed on application 165 and other data associated with the set of operations as described above. In some embodiments, computing device 110 encrypts the set of operations to be performed on application 165 with a public key (e.g., a public key generated during a key exchange between computing device 110 and security manager 160 described above) associated with security manager 160. In other embodiments, computing device 110 encrypts the set of operations to be performed on application 165 with a random key. In some such other embodiments, computing device 110 encrypts the random key with the public key associated with security manager 160 and includes the encrypted random key in the request. This way, this portion of the request is secure during transport since private network 120 (e.g., access manager 135 and/or security manager 160) has the private key for decrypting this portion of the request.

The request may also include access data and a security signature based on a private key (e.g., a private key generated during a key exchange between computing device 110 and security manager 160 described above) associated with computing device 110. In some embodiments, a security signature is used for authenticating data exchanged between computing device 110 and elements in private network 120. Computing device 110 may generate the security signature by generating a hash value (e.g., using an MD5 message-digest algorithm, a secure hash algorithm 1 (SHA-1), etc.) of the request and encrypting the hash value with the private key associated with computing device 110. In some embodiments, computing device 110 generates and sends the request in response to input provided by a user (e.g., user 201) of computing device 110.

In response to receiving the request from computing device 110, queue client 115 may generate a queue message that includes the request (which includes the access data and the security signature) and data associated with the request (e.g., a data source type identifier for identifying a data source type, a data type identifier for identifying a data type, an operation type identifier for identifying an operation type, a service type identifier for identifying a service type, an object type identifier for identifying an object type, an object identifier for identifying an object, etc.). Queue client 115 then sends, at 310, the queue message to queue manager 140. Upon receiving the queue message, queue manager 140 identifies the security signature and decrypts the security signature using a public key (e.g., a public key generated during a key exchange between computing device 110 and security manager 160 described above) associated with computing device 110 in order to validate the security signature. In this example, queue manage 140 may validate the security signature by decrypting the encrypted hash value using the public key associated with computing device 110 and comparing the decrypted hash value to a hash value generated from the request using the same hash algorithm as computing device 110. If the decrypted hash value does not match the hash value generated from the request, queue manager 140 drops the queue message. If the decrypted hash value matches the hash value generated from the request, queue manager 140 stores the queue message for later retrieval by queue monitor 155.

At 315, queue monitor 155 retrieves the queue message from queue manager 140. Upon retrieving the queue message, queue monitor 155, in some embodiments, decrypts the request with a private key (e.g., a private key generated during a key exchange between computing device 110 and security manager 160 described above) associated with security manager 160. As described above, in some embodiments, a random key is used to encrypt the set of operations. In some such embodiments, queue monitor 155 decrypts the encrypted random key with the private key associated with security manager 160 and uses the decrypted random key to decrypt the request.

Queue monitor 155 may then identify the access token in the queue message and requests access manager 135 to validate the access token. Once queue monitor 155 validates the access token, queue monitor 155 sends, at 320, the access token and instructions to perform the set of operation(s) specified in the request to application 165. In response to receiving access token and instructions from queue monitor 155, application 165 determines whether to perform the set of operations based on the access token. As mentioned above, the access token specifies the operation(s) that may be performed, the resource(s) on which the operation(s) may be performed, and user(s) that are authorized to perform the operation(s). Application 165 then sends, at 325, a response associated with the operation to queue monitor 155. In some embodiments, the response may indicate that application 165 successfully performed the requested set of operations.

Upon receiving the response from application 165, queue monitor 155 may generate a queue message that includes the response (also referred to as a queue message response). In some embodiments, queue monitor 155 encrypts the response using a public key (e.g., a public key generated during a key exchange between computing device 110 and security manager 160 described above) associated with computing device 110. In other embodiments, queue monitor 155 encrypts the response from application 165 with a random key. Queue monitor 155 encrypts the random key with the public key associated with security manager 160 and includes the encrypted random key in the response, in some such other embodiments. This way, the response from application 165 is secure during transport since computing device has the private key for decrypting the response.

The queue message may also include a security signature based on a private key (e.g., a private key generated during a key exchange between computing device 110 and security manager 160 described above) associated with security manager 160. In some embodiments, queue monitor 155 generates the security signature by generating a hash value (e.g., using an MD5 message-digest algorithm, a secure hash algorithm 1 (SHA-1), etc.) of the response and encrypting the hash value with the private key associated with security manager 160.

Next, queue monitor 155 forwards, at 330, the queue message response to queue manager 140. Queue manager forwards, at 335, the queue message response to queue client 115, which, in turn, forwards, at 340, the queue message response to computing device 110. As mentioned above, a security signature is used, in some embodiments, for authenticating data exchanged between computing device 110 and elements in private network 120. When computing device 110 receives the queue message response, computing device 110 identifies the security signature and decrypts the security signature using a public key (e.g., a public key generated during a key exchange between computing device 110 and security manager 160 described above) associated with security manager 160 in order to validate the security signature. For example, computing device 110 may validate the security signature by decrypting the encrypted hash value using the public key associated with security manager 160 and comparing the decrypted hash value to a hash value generated from the response using the same hash algorithm as queue monitor 155. If the decrypted hash value does not match the hash value generated from the response, computing device 110 drops the queue message response. If the decrypted hash value matches the hash value generated from the response, computing device 110 decrypts the response using a private key (e.g., a private key generated during a key exchange between computing device 110 and security manager 160 described above) associated with computing device 110. As explained above, in some embodiments, a random key is used to encrypt the response. In some such embodiments, computing device 110 decrypts the encrypted random key with the private key associated with computing device 110 and uses the decrypted random key to decrypt the response.

Figure 4:
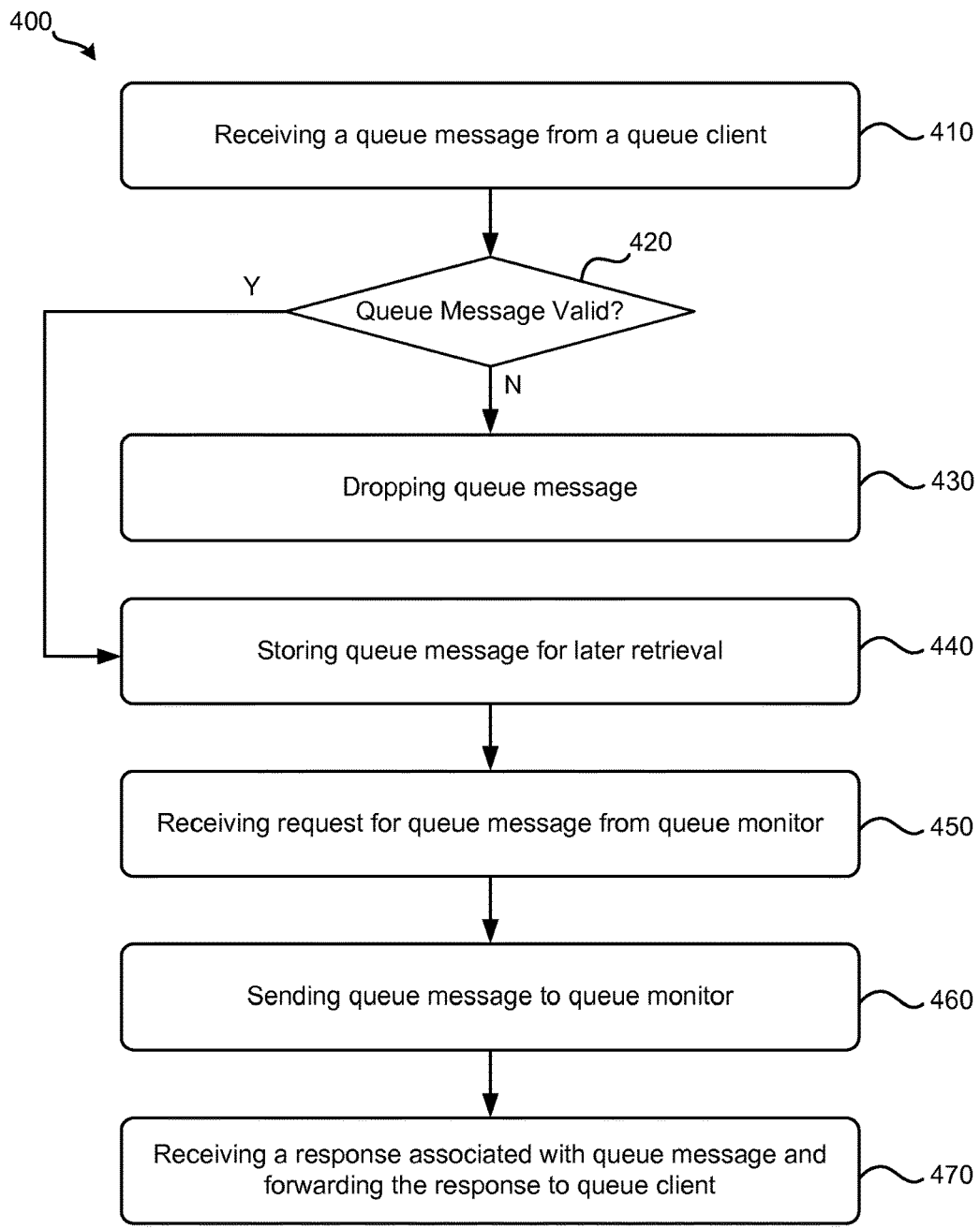
FIG. 4 illustrates a process for facilitating access to a resource according to some embodiments.

FIG. 4 illustrates a process 400 for facilitating access to a resource according to some embodiments. In some embodiments, a queue manager (e.g., queue manager 140) performs the operations in process 400. Process 400 starts by receiving, at 410, a queue message from a queue client (e.g., queue client 115). In some embodiments, the queue message includes a request from a device (e.g., computing device 110) to perform a set of actions on a resource in private network 120 (e.g., application 165). The request from the device may include data associated with the request, as mentioned above, as well as access data and a security signature based on a private key (e.g., a private key generated during a key exchange between computing device 110 and security manager 160 described above) associated with computing device 110. In some embodiments, the device generates the security signature by generating a hash value (e.g., using an MD5 message-digest algorithm, a secure hash algorithm 1 (SHA-1), etc.) of the request and encrypting the hash value with the private key associated with device.

Next, process 400 determines, at 420, whether the queue message is valid. Process 400 may determine whether the queue message is valid based on a public key (e.g., a public key generated during a key exchange between computing device 110 and security manager 160 described above) associated with the device. For instance, in some embodiments, process 400 validates the security signature by decrypting the encrypted hash value using the public key associated with the device and comparing the decrypted hash value to a hash value generated from the request using the same hash algorithm as device. If the decrypted hash value does not match the hash value generated from the request, process 400 determines that the queue message is not valid and drops, at 430, the queue message. If the decrypted hash value matches the hash value generated from the request, process 400 determines that the queue message is valid and stores, at 440, the queue message for later retrieval (e.g., in a message queue). In some embodiments, process 400 may perform additional and/or different validation operations such as the validation operations described above by reference to FIG. 3.

Process 400 then receives, at 450, a request for the queue message from a queue monitor (e.g., queue monitor 155). In response to the request from the queue monitor, process 400 sends, at 460, the queue message to the queue monitor. In some embodiments process 400 deletes (e.g., from a message queue) the queue message after sending the queue message to the queue monitor. Next, process 400 receives, at 470 a response associated with the queue message from the queue monitor and forwards the response associated with the queue message to the client queue. The client queue, in turn, forwards the response associated with the queue message to the device.

Figure 5:
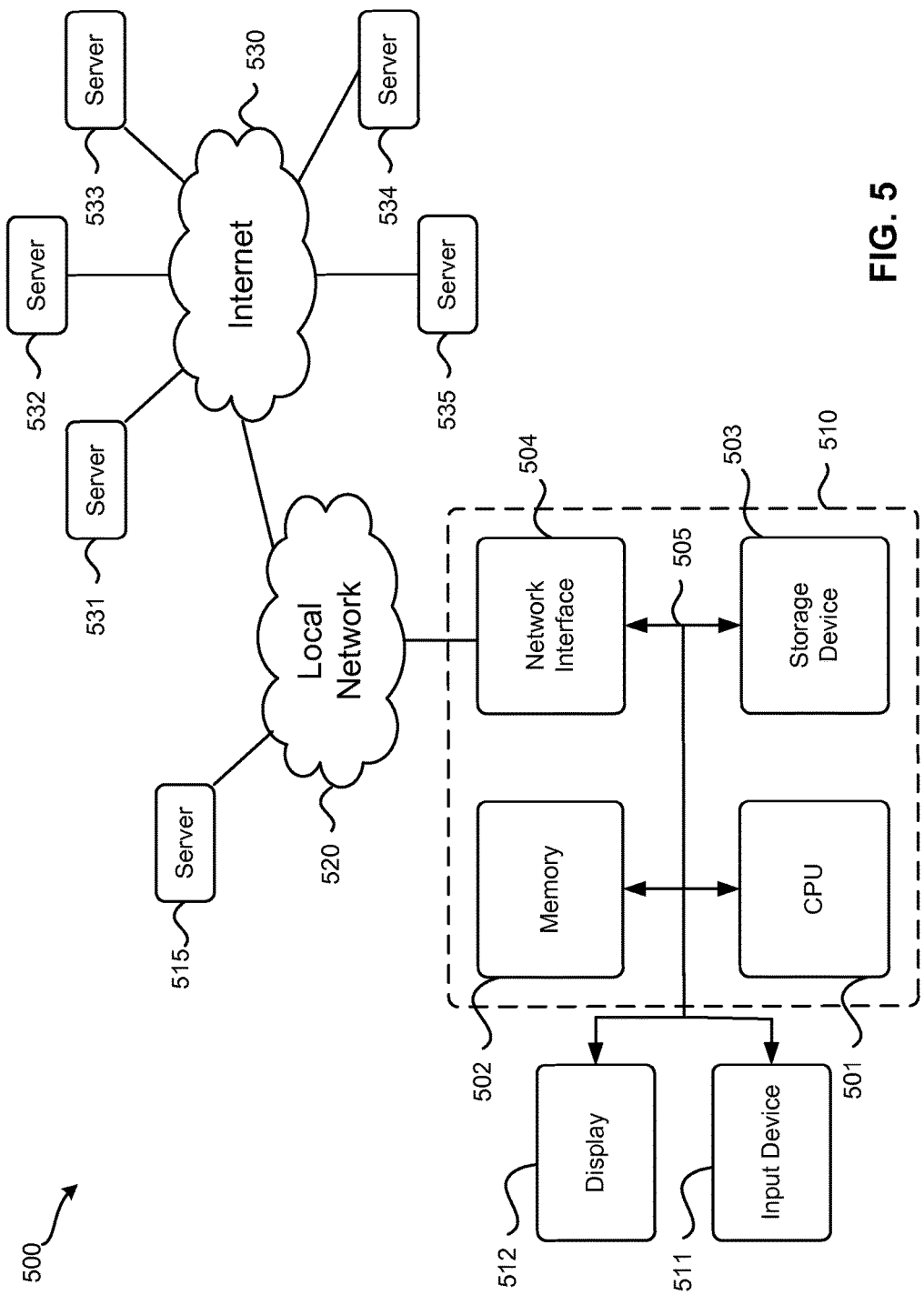
FIG. 5 illustrates an exemplary computer system according to some embodiments.

An exemplary computer system 500 is illustrated in FIG. 5. Computer system 510 includes a bus 505 or other communication mechanism for communicating information, and a processor 501 coupled with bus 505 for processing information. Computer system 510 also includes memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

receiving, through a first firewall, a queue message from a queue client, the queue client generating the queue message in response to receiving, from a first computing device, a request to perform a set of actions on an application hosted on a second computing device belonging in a first network of a private network and a security signature generated from an authentication operation performed by the first computing device, the queue message comprising the request and the security signature, the second computing device configured with and accessible through a private Internet Protocol (IP) address;

storing the queue message in a message queue of the device for later retrieval when the queue message is determined to be valid based on the security signature, the message queue belonging in a second, different network of the private network;

sending, through a second firewall, the queue message from the message queue to a queue monitor belonging to the first network of the private network for the queue monitor to instruct the application to perform the set of actions; and upon receiving, through the second firewall, a response associated with the queue message from the queue monitor, forwarding, through the first firewall, the response associated with the queue message to the queue client in order for the queue client to forward the response associated with the queue message to the first computing device.

2. The non-transitory machine-readable medium of claim 1, wherein the program further comprises a set of instructions for dropping the queue message when the queue message is determined to be not valid based on the security signature.

3. The non-transitory machine-readable medium of claim 1, wherein the program further comprises a set of instructions for receiving, through the second firewall, a request for the queue message from the queue monitor; wherein the queue message is sent to the queue monitor in response to receiving the request for the queue message from the queue monitor.

4. The non-transitory machine-readable medium of claim 1, wherein determining that the queue message is valid based on the security signature comprises decrypting the security signature with a public key associated with the first computing device that is generated during a key exchange between the first computing device and a security manager belonging to the first network of the private network.

5. The non-transitory machine-readable medium of claim 4, wherein the authentication operation generates the security signature by generating a hash value of the request and encrypting the hash value with a private key associated with the first computing device that is generated during the key exchange.

6. The non-transitory machine-readable medium of claim 4, wherein the response is encrypted with the public key associated with the first computing device.

7. The non-transitory machine-readable medium of claim 6, wherein the security signature is a first security signature, wherein the public key is a first public key, wherein the key exchange is a first key exchange, wherein the program further comprises sets of instructions for:
receiving, through the second firewall, a second security signature along with the response associated with the queue message from the queue monitor, wherein the queue monitor generates the second security signature by generating a hash value of the response and encrypting the hash value with a second public key associated with the security manager that is generated during a second key exchange between the first computing device and the security manager belonging to the first network of the private network; and
forwarding, through the first firewall, the second security signature along with the response associated with the queue message to the queue client in order for the queue client to forward the second security signature and the response associated with the queue message to the first computing device.

8. For a device, a method comprising:
receiving, through a first firewall, a queue message from a queue client, the queue client generating the queue message in response to receiving, from a first computing device, a request to perform a set of actions on an application hosted on a second computing device belonging in a first network of a private network and a security signature generated from an authentication operation performed by the first computing device, the queue message comprising the request and the security signature, the second computing device configured with and accessible through a private Internet Protocol (IP) address;
storing the queue message in a message queue of the device for later retrieval when the queue message is determined to be valid based on the security signature, the message queue belonging in a second, different network of the private network;
sending, through a second firewall, the queue message from the message queue to a queue monitor belonging to the first network of the private network for the queue monitor to instruct the application to perform the set of actions; and
upon receiving, through the second firewall, a response associated with the queue message from the queue monitor, forwarding, through the first firewall, the response associated with the queue message to the queue client in order for the queue client to forward the response associated with the queue message to the first computing device.

9. The method of claim 8 further comprising dropping the queue message when the queue message is determined to be not valid based on the security signature.

10. The method of claim 8 further comprising receiving, through the second firewall, a request for the queue message from the queue monitor; wherein the queue message is sent to the queue monitor in response to receiving the request for the queue message from the queue monitor.

11. The method of claim 8, wherein determining that the queue message is valid based on the security signature comprises decrypting the security signature with a public key associated with the first computing device that is generated during a key exchange between the first computing device and a security manager belonging to the first network of the private network.

12. The method of claim 11, wherein the authentication operation generates the security signature by generating a hash value of the request and encrypting the hash value with a private key associated with the first computing device that is generated during the key exchange.

13. The method of claim 11, wherein the response is encrypted with the public key associated with the first computing device.

14. The method of claim 13, wherein the security signature is a first security signature, wherein the public key is a first public key, wherein the key exchange is a first key exchange, wherein the method further comprises:
receiving, through the second firewall a second security signature along with the response associated with the queue message from the queue monitor, wherein the queue monitor generates the second security signature by generating a hash value of the response and encrypting the hash value with a second public key associated with the security manager that is generated during a second key exchange between the first computing device and the security manager belonging to the first network of the private network; and
forwarding, through the first firewall, the second security signature along with the response associated with the queue message to the queue client in order for the queue client to forward the second security signature and the response associated with the queue message to the first computing device.

15. A system comprising:
a set of processing units;
a non-transitory computer-readable medium storing instructions that when executed by at least one processing unit in the set of processing units cause the at least one processing unit to:
receive, through a first firewall, a queue message from a queue client, the queue client generating the queue message in response to receiving, from a first computing device, a request to perform a set of actions on an application hosted on a second computing device belonging in a first network of a private network and a security signature generated from an authentication operation performed by the first computing device, the queue message comprising the request and the security signature, the second computing device configured with and accessible through a private Internet Protocol (IP) address;

store the queue message in a message queue of the system for later retrieval when the queue message is determined to be valid based on the security signature, the message queue belonging in a second, different network of the private network;

send, through a second firewall, the queue message from the message queue to a queue monitor belonging to the first network of the private network for the queue monitor to instruct the application to perform the set of actions;

upon receiving, through the second firewall, a response associated with the queue message from the queue monitor, forward, through the first firewall, the response associated with the queue message to the queue client in order for the queue client to forward the response associated with the queue message to the first computing device.

16. The system of claim 15, wherein the instructions further cause the at least one processing unit to drop the queue message when the queue message is determined to be not valid based on the security signature.

17. The system of claim 15, wherein determining that the queue message is valid based on the security signature comprises decrypting the security signature with a public key associated with the first computing device that is generated during a key exchange between the first computing device and a security manager belonging to the first network of the private network.

18. The system of claim 17, wherein the authentication operation generates the security signature by generating a hash value of the request and encrypting the hash vale with a private key associated with the first computing device that is generated during the key exchange.

19. The system of claim 17, wherein the response is encrypted with the public key associated with the first computing device.

20. The system of claim 15, wherein the security signature is a first security signature, wherein the public key is a first public key, wherein the key exchange is a first key exchange, wherein the instructions further cause the least one processing unit to:

receive, through the second firewall, a second security signature along with the response associated with the queue message from the queue monitor, wherein the queue monitor generates the second security signature by generating a hash value of the response and encrypting the hash value with a second public key associated with the security manager that is generated during a second key exchange between the first computing device and the security manager belonging to the first network of the private network; and forward, through the first firewall, the second security signature along with the response associated with the queue message to the queue client in order for the queue client to forward the second security signature and the response associated with the queue message to the first computing device.

\* \* \* \* \*